United States Patent [19]
Ryu

[11] Patent Number: 5,793,512
[45] Date of Patent: Aug. 11, 1998

[54] OPTICAL COMMUNICATION SYSTEM

[75] Inventor: Shiro Ryu, Tokyo, Japan

[73] Assignee: Kokusai Denshin Denwa Kabushiki Kaisha, Itabashi, Japan

[21] Appl. No.: 592,862

[22] Filed: Jan. 24, 1996

[30] Foreign Application Priority Data

Jan. 25, 1995 [JP] Japan ................................. 7-027731

[51] Int. Cl.$^6$ ................................................. H04B 10/02
[52] U.S. Cl. ........................ 359/179; 359/160; 359/176; 359/341
[58] Field of Search .................................. 359/124, 161, 359/133, 134, 160, 174, 179, 176, 337, 341

[56] References Cited

U.S. PATENT DOCUMENTS

| | | | |
|---|---|---|---|
| 5,315,674 | 5/1994 | Asako | 385/15 |
| 5,355,248 | 10/1994 | Hadjifotiou | 359/341 |
| 5,396,360 | 3/1995 | Majima | 359/133 |
| 5,406,404 | 4/1995 | DiGiovanni et al. | 359/161 |
| 5,485,299 | 1/1996 | Jones | 359/179 |
| 5,542,011 | 7/1996 | Robinson | 385/24 |
| 5,572,356 | 11/1996 | Yoshida et al. | 359/341 |

OTHER PUBLICATIONS

Kikuchi, Kazuo, "Enhancement of Optical–Amplifier Noise by Nonlinear Refractive Index and Group–Velocity Dispersion of Optical Filters," *IEEE Photonics Technology Letters*, vol. 5, No. 2, Feb. 1993, pp. 221–223.

Ryu, Shiro, et al., "Long–Haul Coherent Optical Fiber Communication Systems Using Optical Amplifiers," *Journal of Lightwave Technology*, vol. 9, No. 2, Feb. 1991, pp. 251–260.

Chraplyvy, Andrew R., "Limitations on Lightwave Communications Imposed by Optical–Fiber Nonlinearities," *Journal of Lightwave Technology*, vol. 8, No. 10, Oct. 1990, pp. 1548–1557.

Ryu, Shiro, "Signal Linewidth Broadening due to Nonlinear Kerr Effect in Long–Haul Coherent Systems using Cascaded Optical Amplifiers," *Journal of Lightwave Technology*, vol. 10, No. 10, Oct. 1992, pp. 1450–1457.

Kobayashi, S. and Kimura, T., "Injection Locking in AlGaAs Semiconductor Laser," *IEEE Journal of Quantum Electronics*, vol. QE–17, No. 5, May 1981, pp. 681–689.

*Primary Examiner*—Rafael Bacares
*Attorney, Agent, or Firm*—Pollock, Vande Sande & Priddy

[57] ABSTRACT

An optical communication system in which the degradation of the signal-to-noise-ratio during transmission is alleviated. An optical signal from an optical transmitter is propagated over a transmission line comprising optical fibers and optical amplifiers, and received by an optical receiver. The signal-to-noise ratio is improved by inserting an injection-locked laser device at a specified point on the optical transmission line, improving the transmission characteristics of the optical communication system.

14 Claims, 9 Drawing Sheets

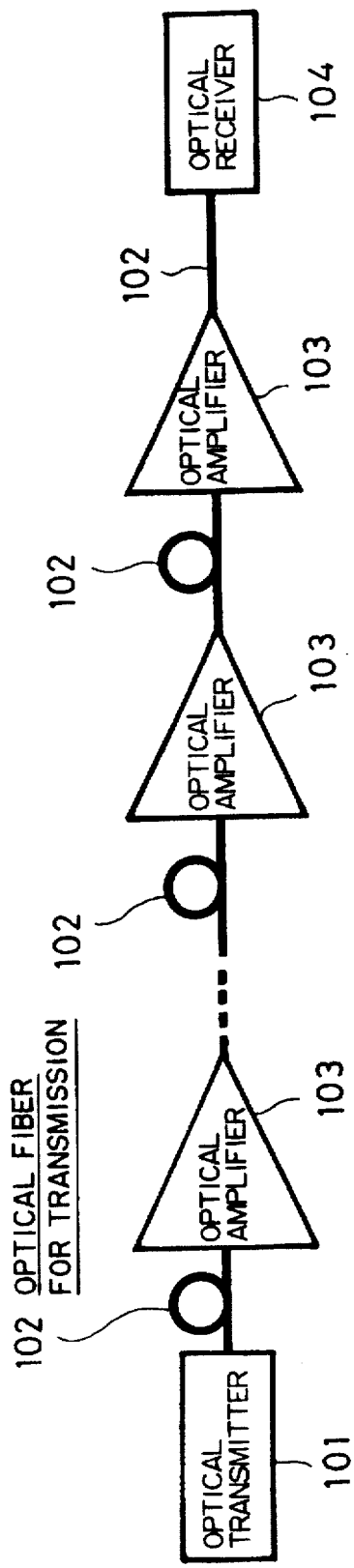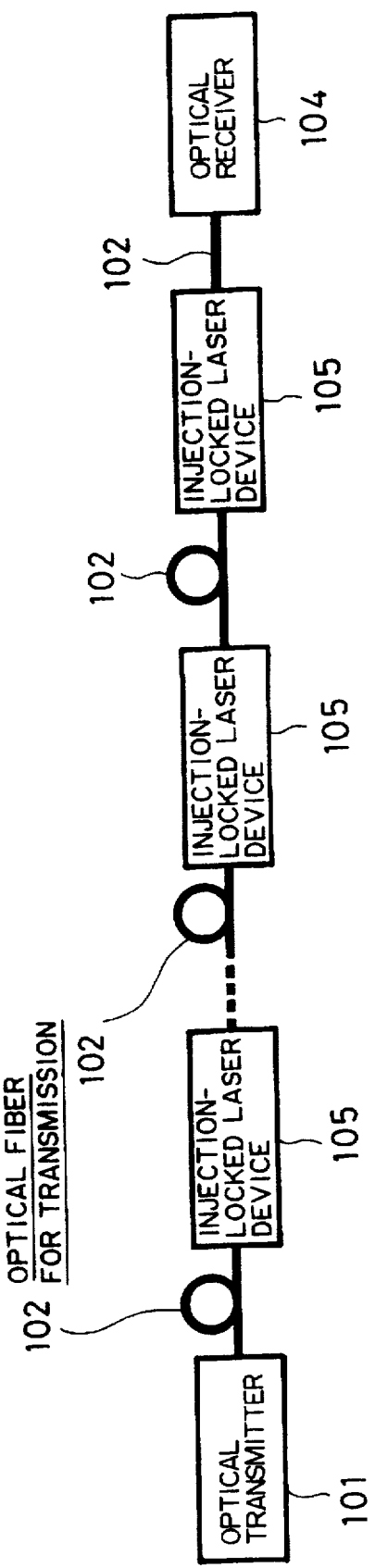

OPTICAL COMMUNICATION SYSTEM

BACKGROUND OF THE INVENTION

1. Field of the Invention

The present invention relates to an optical communication system, of which a trunk line comprises an optical transmission fiber. This is particularly suitable for a coherent optical transmission system.

2. Description of the Prior Art

Recently, an optical communication system called the coherent optical transmission system to modulate a light by the frequency-shift keying (FSK) or phase-shift keying (PSK) is disclosed. This coherent optical transmission system permits a large capacity of transmission and the range of the detectable receiving level is broadened, expecting the extension of the transmission distance.

In the optical communication system, including the coherent optical transmission system with long-haul trunk lines comprising optical lines, optical amplifiers like optical fiber amplifiers are conventionally located at some spacings on the optical line to compensate for the degradation of signal-to-noise ratio due to the attenuation characteristics of optical lines, lessening the degradation of signal-to-noise ratio during transmission.

FIG. 8(a) shows a configuration of a conventional optical communication system; reference numeral 101 indicates an optical transmitter to transmit an optical signal, reference numeral 102 indicates an optical transmission fiber to comprise an optical line, reference numeral 103 indicates an optical amplifier to output a light just amplified without reshaping and regenerating, and reference numeral 104 indicates an optical receiver to receive an optical signal.

In the optical communication system described above, an optical signal output from the optical transmitter 101 is propagated through the optical transmission fibers 102. Since the attenuation characteristics of the optical transmission fibers 102 inflict a transmission loss on the optical signal, the transmission loss is compensated by an optical amplifier 103. Therefore, optical amplifiers 103 are inserted at some spacings along the specified optical transmission fibers 102. In this way, the optical signal propagated through the optical transmission fibers 102 is received by the optical receiver 104.

However, in such an optical communication system, since amplifying and relaying the attenuated optical signal are repeated, spontaneous emission noises are accumulated, causing a problem of the degradation of the transmission characteristics on the system, as described in the IEEE Journal of Lightwave Technology, the ninth volume, number 2, in February 1991, written by S. Ryu et al, "Long-haul coherent optical fiber communication systems using optical amplifiers" pp. 251-260.

Moreover, there is the so-called effect of self-phase modulation; the spontaneous emission noise and/or the chromatic dispersion of the optical transmission fibers 102, and/or a slight intensity noise of the optical signals owing to the residual intensity modulation generated in the optical transmitter 101 are converted to phase noise by a nonlinear optical effect of the optical fibers, as described in the IEEE Journal of Lightwave Technology, the tenth volume, number 10 in October 1992, written by S. Ryu, "Signal Linewidth broadening due to nonlinear Kerr effect in long-haul coherent systems using cascaded optical amplifiers" pp. 1450-1457, and the IEEE Photonics Technology Letters, the fifth volume, number 2 in February 1993, written by K. Kikuchi, "Enhancement of optical-amplifier noise by nonlinear refractive index and group-velocity dispersion of optical fibers", pp. 221-223.

In the coherent optical transmission with FSK or PSK, the amplitude of the optical signal is constant and not easily affected by the nonlinear optical effect. However, if intensity noise is generated by addition of noise, the intensity noise is converted to the phase noise as described above. This effect degrades the characteristics of the optical communication system.

Moreover, in the wavelength-division multiplexed optical communication system using several optical signals from the transmitter 101 simultaneously, generating several wavelengths, it has been indicated that the noise light due to fiber four-wave mixing degrades the characteristics of the system, as described in the IEEE Journal of Lightwave Technology, the eighth volume, number 10, in October 1990, written by A. R. Chraplyvy, "Limitations on lightwave communications imposed by optical-fiber nonlinearities", pp. 1548-1557.

In the case of containing the intensity noise component within each signal light, it is indicated that the phase noise of each signal light is increased due to the so-called effect of cross-phase modulation.

As the propagation distance becomes longer, the effects of these various noises are increased, providing a problem in the conventional optical communication such that the various noises accumulated during transmission impairs an excellent transmission state.

FIG. 9(a) is an example of the noise spectrum in the optical communication system shown in FIG. 8(a).

Now a method to amplify lights by an injection-locked laser is already known, so the optical communication system shown in FIG. 8(b), inserting an injection-locked laser 105 instead of the optical amplifier 103, is devised. However, it is not actualized since this optical communication system has the following demerits.

Since the injection-locked laser can amplify only a narrow bandwidth, a high frequency component of the modulation signal is degraded with cascaded amplifiers, impairing the transmission quality. So it can not be applied in to a long-haul optical transmission system with cascaded amplifiers.

Additionally, since the injection-locked laser 105 can amplify only one wave in principle, it is not able to be applied to the optical communication system to transmit wavelength-division multiplexed lights.

It is therefore an object of the present invention to provide an optical communication system which can alleviate the effect of the intensity noise generated during transmission.

SUMMARY OF THE INVENTION

To accomplish the preceding object, the optical communication system of the present invention comprises: an optical transmitter connected to one end of the optical line comprising the optical transmission fibers; and an optical receiver connected to the other end of said optical line; and optical amplifiers without the reshaping or regenerating functions inserted in the middle of said optical line; and an injection-locked laser device inserted in an appropriate point of said optical line.

Additionally, in said optical communication system wherein said optical transmitter is configured to transmit wavelength-division multiplexed lights, and said optical receiver is configured to receive the wavelength-division multiplexed lights, an optical divider which divides the wavelength-division multiplexed lights is equipped in front of said injection-locked laser devices; and an optical combiner is equipped after the injection-locked laser devices to combine several optical signals output from the injection-locked laser devices which comprises the same number of injection-locked laser devices with the number of the wavelength-division multiplexed optical signals; then the optical signal divided by said divider is applied to said injection-locked laser wherefrom the optical signal with a certain wavelength of the wavelength-division multiplexed lights is amplified and output to said combiner.

Another embodiment of the optical communication system of the present invention comprises: an optical line comprising optical transmission fibers where wavelength-division multiplexed lights are propagated; an optical transmitter connected to one end of said optical line to transmit said wavelength-division multiplexed lights; two or more branched optical lines are divided at a specified branching point of said optical line; and two or more receivers at the other ends to receive said branched wavelength-division multiplexed lights propagated through said branched optical lines; optical amplifiers without the reshaping or regenerating functions and inserted in the middle of said optical line; and wherein said wavelength-division multiplexed lights are divided by an optical divider at said branching point in said optical line, and said branched optical signal is divided into two or more groups; and said optical signals are respectively applied to the several injection-locked laser devices in each divided group; and the outputs of said several injection-locked laser devices are combined by an optical combiner prepared for said branched optical lines respectively; wherein said branched wavelength-division multiplexed lights are generated by an optical combiner in said group respectively; and therefrom transmitted to said branched optical lines respectively for each route.

Another embodiment of the optical communication system of the present invention comprises: two or more routes of branched optical lines coupled to a single optical line at a specified coupling point; an optical receiver connected to one end of said optical line to receive the wavelength-division multiplexed lights propagated through the optical line; two or more optical transmitters connected to the other ends of two or more branched optical lines to transmit the branched wavelength-multiplexed lights; optical amplifiers without the reshaping or regenerating functions inserted in the middle of said optical line and the said branched optical line; the wavelength-division multiplexed lights propagated through respective routes are divided at the coupling point for two or more routes of the branched optical lines; and respective optical signals divided are applied to several injection-locked laser devices respectively; whereby an optical combiner combines the optical signals with respective wavelength output from said several injection laser devices; the wavelength-division multiplexed lights are generated from the branched wavelength-division multiplexed lights propagated through the branched optical lines of two or more routes; wherefrom it is transmitted to a single optical line.

Moreover, in the preceding optical communication system, the output from the optical transmitter may be transmitted via the injection-locked laser device.

Generally, when the frequency modulated light or phase modulated light is applied to the injection-locked laser device, the modulation information of the input light is taken over output light, however, the intensity of the output light is fixed and independent of the intensity of the input light, as described in the IEEE Journal of Quantum Electronics, the seventeenth volume, number 5, in May 1981 written by S. Kobayashi and T. Kimura, "Injection locking in AlGaAs semiconductor laser", pp.681–689. Namely, the injection-locked laser device has the reshaping and regenerating functions.

Consequently, even if an intensity modulation component owing to the noise component generated during transmission is contained in the input light, the intensity modulation component is suppressed enough, providing the output light wherein its intensity noise is suppressed sufficiently at the output port.

In this way, the conventional problem that the characteristics of the optical communication are degraded by the conversion of the intensity noise to the phase noise can be resolved, permitting long-haul transmission exceeding 4,000 km by far which is the approximate limit of the transmission distance in the conventional coherent optical communication system.

BRIEF DESCRIPTION OF THE DRAWINGS

The present invention will be describe in detail below in comparison with prior art with reference to accompanying drawings in which:

FIG. 8 is a block diagram showing an example of the arrangement of conventional optical communication systems;

DESCRIPTION OF THE PREFERRED EMBODIMENTS

This invention will be described in further detail by reference to the accompanying drawings.

Figure 1:
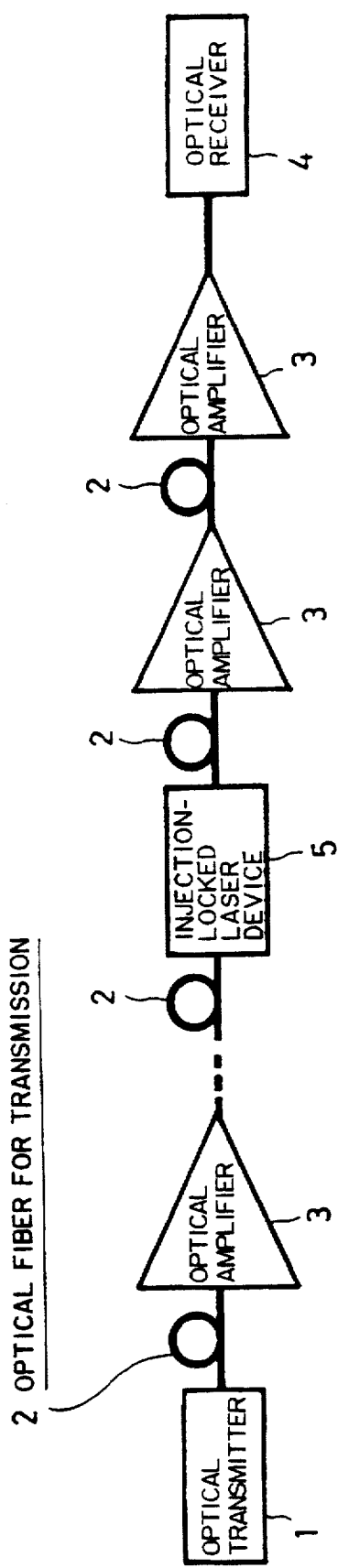
FIG. 1 is a block diagram illustrating a first embodiment of the optical communication system of the present invention.

FIG. 1 is a block diagram illustrating a first embodiment of the present invention. In FIG. 1, reference numeral 1 indicates an optical transmitter to transmit an optical signal, reference numeral 2 indicates an optical transmission fiber to comprise an optical line, reference numeral 3 indicates an optical amplifier called an erbium-doped optical fiber amplifier which amplifies a light without reshaping or regenerating and outputs it, numeral 4 indicates an optical receiver to receive the optical signal, and numeral 5 indicates an injection-locked laser device which has the reshaping and regenerating functions.

In the optical communication system configured as described above, the optical signal output from the optical transmitter 1 is propagated through the optical transmission fibers 2. Since the attenuation characteristics of the optical transmission fibers 2 inflict a transmission loss on the optical signal, the transmission loss is compensated by the optical amplifiers 3. Therefore, optical amplifiers 3 are inserted at some spacings along the specified optical transmission fibers 2 in the optical communication system. In this way, the optical signal propagated through the optical transmission fibers 2 is received by the optical receiver 4.

Additionally, the injection-locked laser device 5 used to eliminate the intensity noise applied during transmission is inserted at a specified point of the optical transmission fiber 2.

Describing further detail, modulation applied to the optical signal output from the optical transmitter 1 is frequency modulation or phase modulation which keeps the intensity of the optical signal principally unchanged. The optical signal propagated through the optical line comprising the optical transmission fiber 2 and the optical amplifier 3 as a fundamental element, is accompanied by the intensity noise component during transmission as described above.

Therefore, after the appropriate distance in which the optical signal is propagated through the optical transmission fiber 2, the injection-locked laser device 5 is inserted on the optical transmission fiber 2. Since the injection-locked laser device 5 has the function to eliminate the intensity modulation component only, the remaining frequency modulated or phase modulated signal component of the transmission light is unchanged. Accordingly, the output of the injection-locked laser device 5 does not contain the intensity modulation component improving the signal-to-noise ratio.

After the optical signal output from the injection-locked laser device 5 is propagated through the optical line comprising the optical transmission fibers 2 and the optical amplifiers 3, it is received by the optical receiver 4.

In this way, inserting the injection-locked laser device 5 on the optical transmission fiber 2 allows the intensity noise component generated during transmission suppressed, providing excellent transmission to be characteristics and long-haul transmission.

The optical communication system shown in FIG. 1 is an example when a single injection-locked laser device 5 is inserted, however, more than one may be inserted on the optical transmission fibers 2 if necessary. Inserting the injection-locked laser devices at some spacings of transmission distance is more effective unless otherwise the phase noise component generated by the conversion of the intensity noise component of the light propagated through the optical line comprising the optical transmission fibers 2 and the optical amplifiers 3 affects the transmission characteristics of the system. Moreover, the optical amplifiers 3 may be connected to the input and output of the injection-locked laser device instead of the optical transmission fibers 2.

Now, following is the measurement results of the intensity noise spectrum in the optical communication system of the present invention shown in FIG. 1. In the experiment, 16 units of the optical amplifiers 3 are used and the length of the optical transmission fibers 2 between respective optical amplifiers 3 is set at 66 km. And, the output light power of the optical amplifiers is set at +10 dBm, the optical signal used in the transmission has a data rate of 2.488 Gb/s, a modulation index of 0.8, and modulated using the continuous phase frequency-shift keying (CPFSK) format.

Figure 9A:
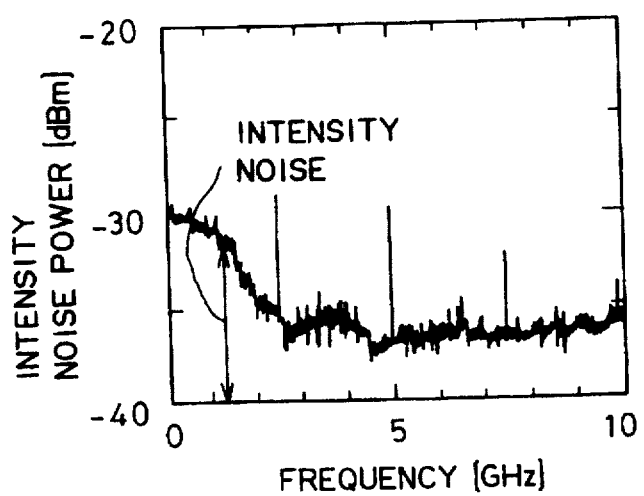
FIG. 9 is a graphical representation showing the measurement results of the intensity noise spectrum of a signal light in a conventional optical communication system and that of the present invention.
Figure 9B:
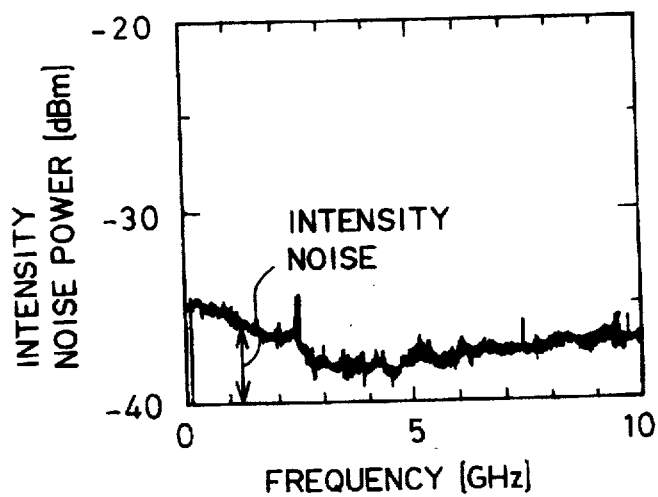

The measurement results of the frequency characteristics of the intensity noise power of the input light to the optical receiver 4, in the optical communication system where the injection-locked laser device 5 is inserted after the eighth optical transmission fiber, counting from the nearest fiber 2 to the optical transmitter 1, are shown in FIG. 9(b).

The measurement result of frequency characteristics of the intensity noise power of the input light to the optical receiver 4 in the conventional configuration without the injection-locked laser device 5 is shown in FIG. 9(a).

The measurement is performed within the range from 0 to 10 GHz. In the conventional configuration, undesired intensity modulation component (periodical line spectrum components) accompanied with the continuous phase frequency-shift keying, and the intensity noise due to the spontaneous emission noise are observed, however, these noises are suppressed sufficiently with the present invention. Namely, the present invention allows the intensity noise component of the signal light to be sufficiently suppressed.

Figure 2:
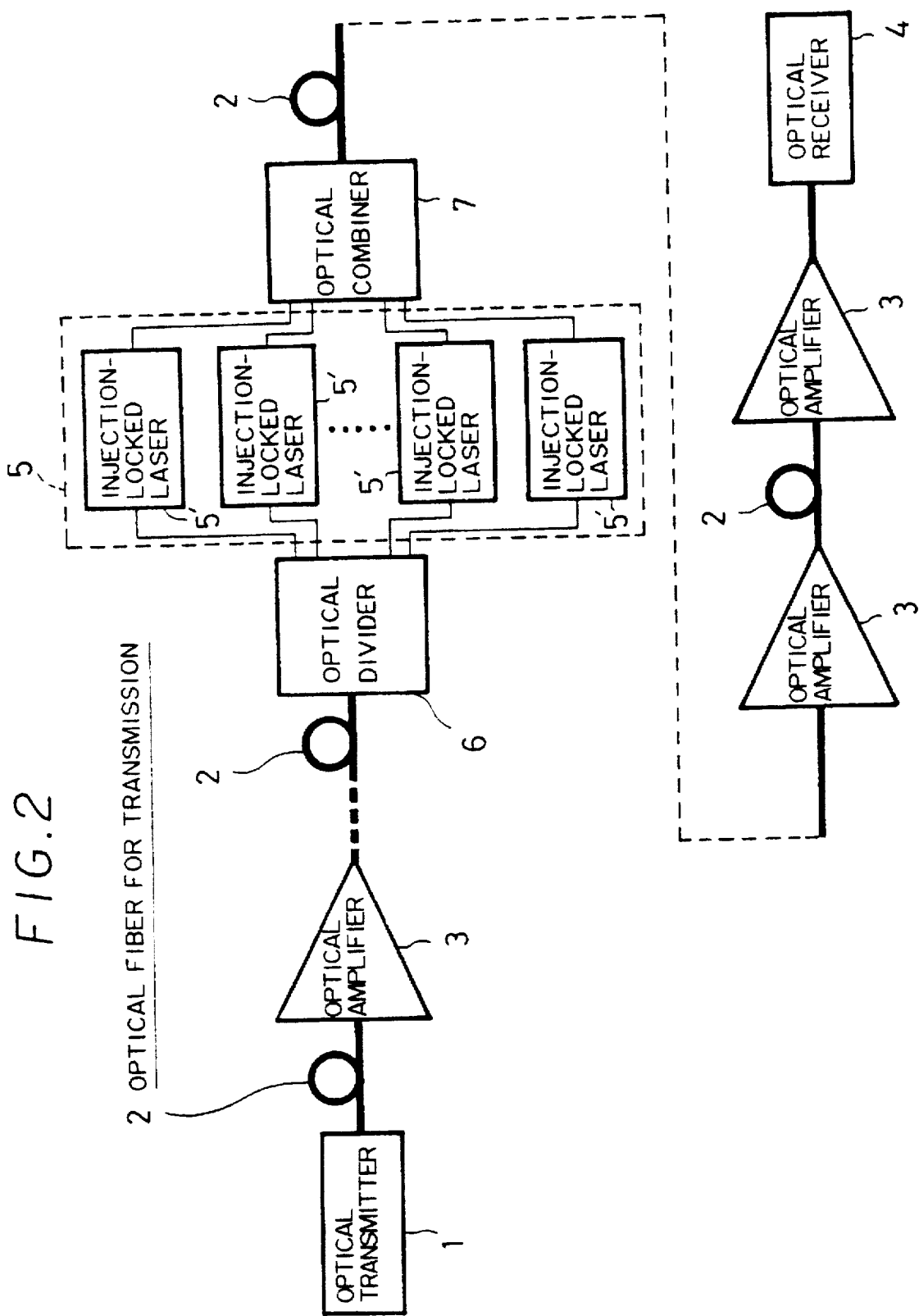
FIG. 2 is a block diagram illustrating a second embodiment of the optical communication system of the present invention.

The configuration of the second embodiment of the optical communication system of the present invention is shown in FIG. 2. In FIG. 2, the same reference numerals are assigned to the same components as in FIG. 1, omitting their description. The second embodiment is an optical communication system which transmits an optical signal with wavelength-division multiplexing.

In this FIG. 2, reference numeral 1 is the optical transmitter to transmit the wavelength-division multiplexed lights, reference numeral 6 indicates the optical divider to divide the wavelength-division multiplexed lights, and numeral 7 indicates the optical combiner to recombine the wavelength-division multiplexed lights by combining the optical signal with respective wavelengths.

The second embodiment relates to the wavelength-division multiplexed optical communication system, where various information according to several optical signals with different wavelengths transmitted from the optical transmitter 1 is transmitted, and the wavelength-division multiplexed optical signals output from the optical transmitter 1 are propagated through a certain distance of the transmission line comprising the optical transmission fibers 2 and the optical amplifiers 3, and then applied to the optical divider 6.

The optical divider 6 has the function to divide the applied wavelength-division multiplexed optical signals and to distribute them to an injection-locked laser device comprising the same number of injection-locked lasers 5' as that of the multiplexed wavelengths.

The injection-locked laser 5' generally synchronizes only with an input light having an adjacent wavelength to the adjusted oscillation wavelength, and does not synchronize with input light having another wavelength. The injection-locked laser device comprises injection-locked lasers as many in number as the number of wavelengths. By setting the oscillation wavelength of each injection-locked laser 5' to be adjacent to the respective optical signals of the wavelength-division multiplexed optical signals, the intensity noise is eliminated for the optical signal of respective wavelength, improving the signal-to-noise ratio.

Then, by combining the output light from respective injection-locked lasers 5' by the optical combiner 7, the wavelength-division multiplexed lights are generated. They are then propagated through an optical line comprising the optical transmission fibers 2 and the optical amplifiers 3, and the wavelength-division multiplexed lights are received by the optical receiver 4.

In this way, according to the second embodiment, the injection-locked laser device 5 which comprises the same number of injection-locked lasers 5' as the number of the wavelength-division multiplexed optical signals suppresses the intensity noise of the wavelength-division multiplexed optical signals, improving the transmission characteristics.

Figure 3:
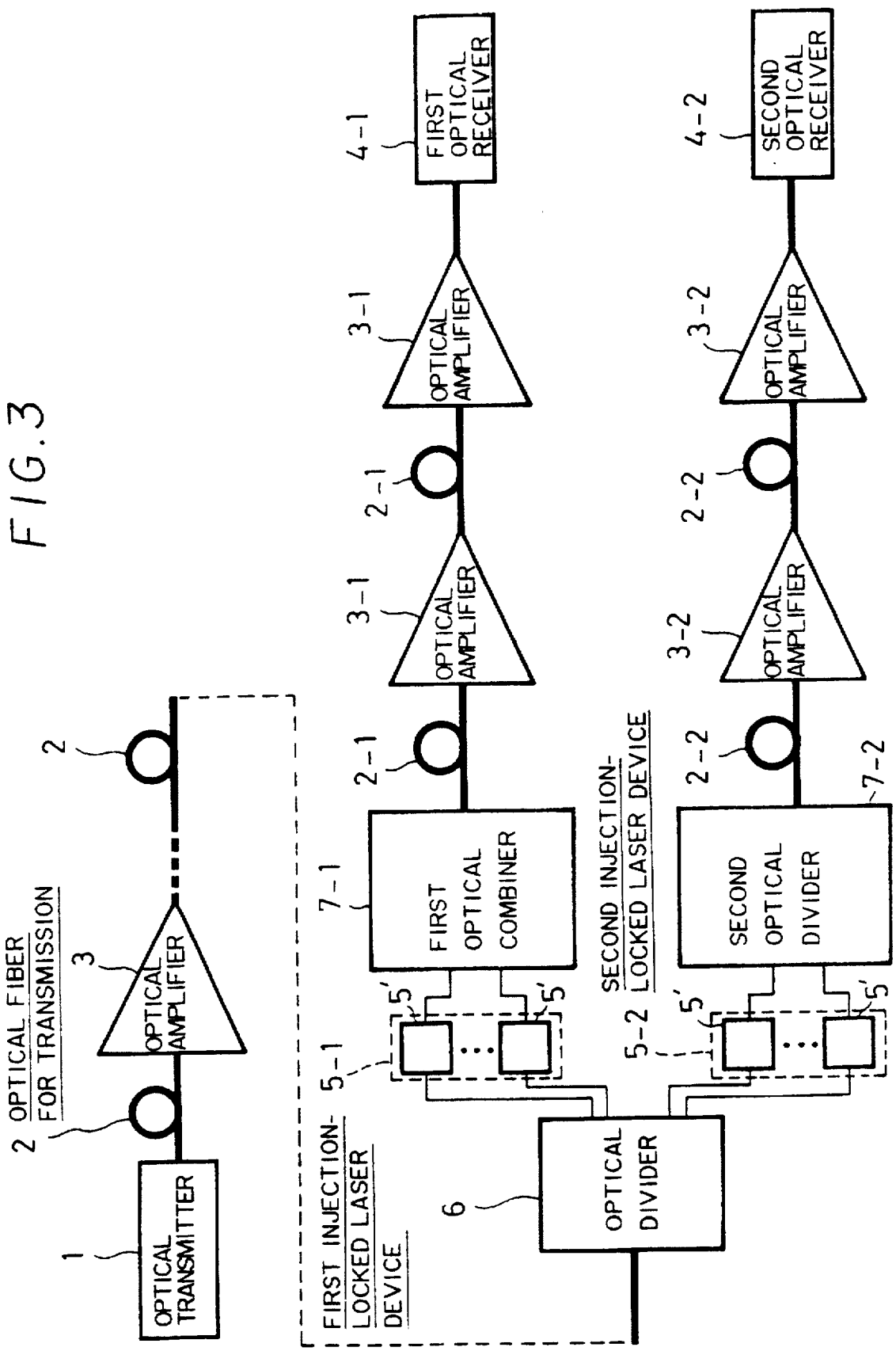
FIG. 3 is a block diagram illustrating a third embodiment of the optical communication system of the present invention.

The arrangement of the third embodiment of the optical communication system of the present invention is shown in FIG. 3. In FIG. 3, the same reference numerals are assigned to the same components as in FIG. 2, omitting their description; however, reference numerals 5-1 and 5-2 indicate the injection-locked laser devices for division, 7-1 and 7-2 indicate the optical combiners for division, 2-1 and 2-2 indicate the optical transmission fibers to comprise the branched optical lines, 3-1 and 3-2 indicate the optical amplifiers inserted on the branched optical lines, and 4-1 and 4-2 indicate the optical receivers connected to the other ends of the branched optical lines.

The third embodiment contains the division on the optical line and it is related to the optical communication system which transmits the wavelength-division multiplexed lights.

In FIG. 3, the wavelength-division multiplexed optical signals output from the optical transmitter 1 are propagated through a certain distance of the transmission line comprising the optical transmission fibers 2 and the optical amplifiers 3, and then applied to the optical divider 6. The wavelength-division multiplexed optical signals are divided by the optical divider 6, then divided into a number of groups to be divided. In this case, the optical signal to be divided into two branches is divided into two groups.

The optical signals divided into two groups are applied to respective injection-locked laser devices 5-1 and 5-2.

In the first injection-locked laser device 5-1 and second injection-locked laser device 5-2, the optical signals are introduced to the injection-locked laser 5 prepared for selecting respective wavelengths and eliminating the intensity noise of the optical signals with respective wavelengths. The output light from the first injection-locked laser device is fed into the first optical combiner 7-1 to recombine the first branched wavelength-division multiplexed light. Similarly, the output light from the second injection-locked laser device is fed into the second optical combiner 7-2 to recombine the second branched wavelength-division multiplexed light.

In this way, respective wavelength-division multiplexed optical signals divided into two groups are propagated through the first branched optical line comprising the optical transmission fibers 2-1 and the optical amplifiers 3-1 or the second branched optical line comprising the optical transmission fibers 2—2 and the optical amplifiers 3-2 and the optical amplifiers 3-2 and received by the first optical receiver 4-1 or the second optical receiver 4-2.

The injection-locked laser devices 5-1 and 5-2 prepared for respective branched groups synchronize with the signal light with the particular wavelength alone, and only the signal light of required wavelength is led into the branched direction, obtaining the suppression effect of the intensity noise component of the signal light with other wavelengths.

The branching route is not limited to two, however, three or more routes may be allowed.

Figure 4:
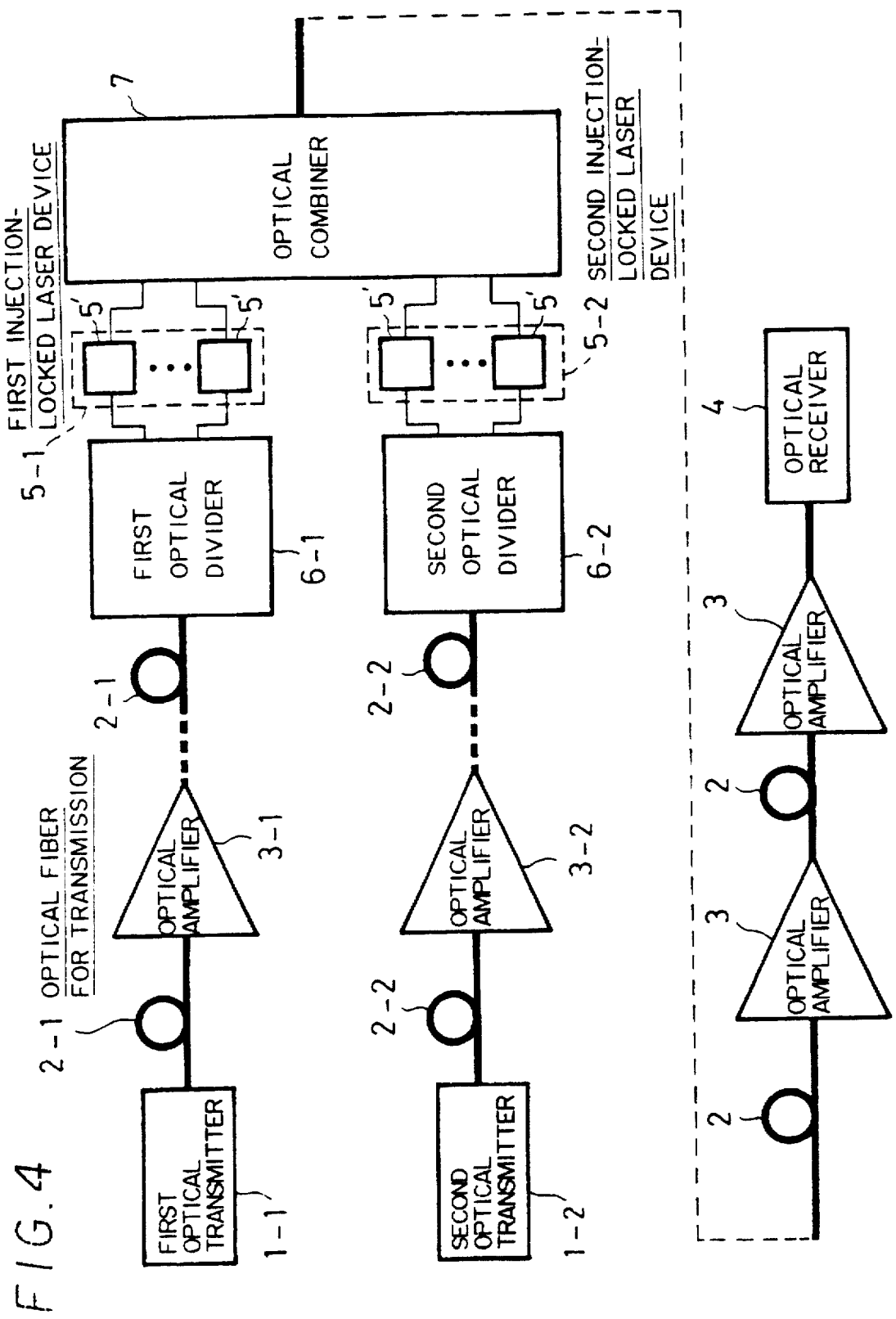
FIG. 4 is a block diagram illustrating a fourth embodiment of the optical communication system of the present invention.

The configuration of the fourth embodiment of the optical communication system of the present invention is shown in FIG. 4. In FIG. 4, the same reference numerals are assigned to the same components as in FIG. 3, omitting their description; however, reference numerals 6-1 and 6-2 indicate the optical dividers which respectively equipped on the branched optical lines.

The fourth embodiment contains the structure to couple the branched optical lines and relates to the optical communication system to transmit the wavelength-division multiplexed lights.

In the fourth embodiment, the branched wavelength-division multiplexed optical signals output from the first optical transmitter 1—1 are propagated through the first branched optical line comprising the first optical transmission fibers 2-1 and the first optical amplifiers 3-1 for certain distance, then applied to the first optical divider 6-1. The wavelength-division multiplexed optical signals are divided there, and applied to the first injection-locked laser device 5-1.

The first injection-locked laser device 5-1 has the same number of injection-locked lasers 5' as the number of the branched wavelength-division multiplexed optical signals propagated through the first branched optical line, and the branched optical signal is applied to the respective injection-locked laser 5 to eliminate the intensity noise against the optical signals with respective wavelengths. Then, the output light from the first injection-locked laser device 5-1 is fed into the optical combiner 7.

The branched wavelength-division multiplexed optical signals output from the second optical transmitter 1-2 are propagated through the second branched optical line comprising the optical transmission fibers 2—2 and optical amplifiers 3-2 and then fed into the second optical divider 6-2 after the certain distance of propagation. The branched wavelength-division multiplexed optical signals are divided there, and then applied to the second injection-locked laser device 5-2.

The second injection-locked laser device 5-2 has the same number of injection-locked lasers 5' as the number of the branched wavelength-division multiplexed optical signals to propagate through the second branched optical line, and the branched optical signal is applied to a to respective injection-locked laser 5' to eliminate the intensity noise on the optical signals with respective wavelengths. Then, the output light from the second injection-locked laser 5-2 is fed to the optical combiner 7 with the output light from the first injection-locked laser device 5-1 to be combined.

Accordingly, the optical signals propagated through the first branched optical line and the second branched optical line are combined into the wavelength-division multiplexed lights and applied to the single optical line. The wavelength-division multiplexed lights propagated through this optical line comprising the optical transmission fibers 2 and the optical amplifiers 3 is received by the optical receiver 4.

Since the injection-locked laser devices 5-1 and 5-2, where the respective branched wavelength-division multiplexed optical signals branched in two directions are applied, synchronize only with optical signals of a specific wavelength, an optical signal of desired wavelength is fed to the optical combiner 7, eliminating the intensity noise component of the signal light with respective wavelengths.

Accordingly, it permits the intensity noise component of the signal light with a respective wavelength to be suppressed, improving the transmission characteristics of the system and allowing the branched optical signals in desired direction to be combined.

The branched optical line to propagate the optical signals to be combined are not limited to two routes, so three or more routes are allowed.

Figure 5:
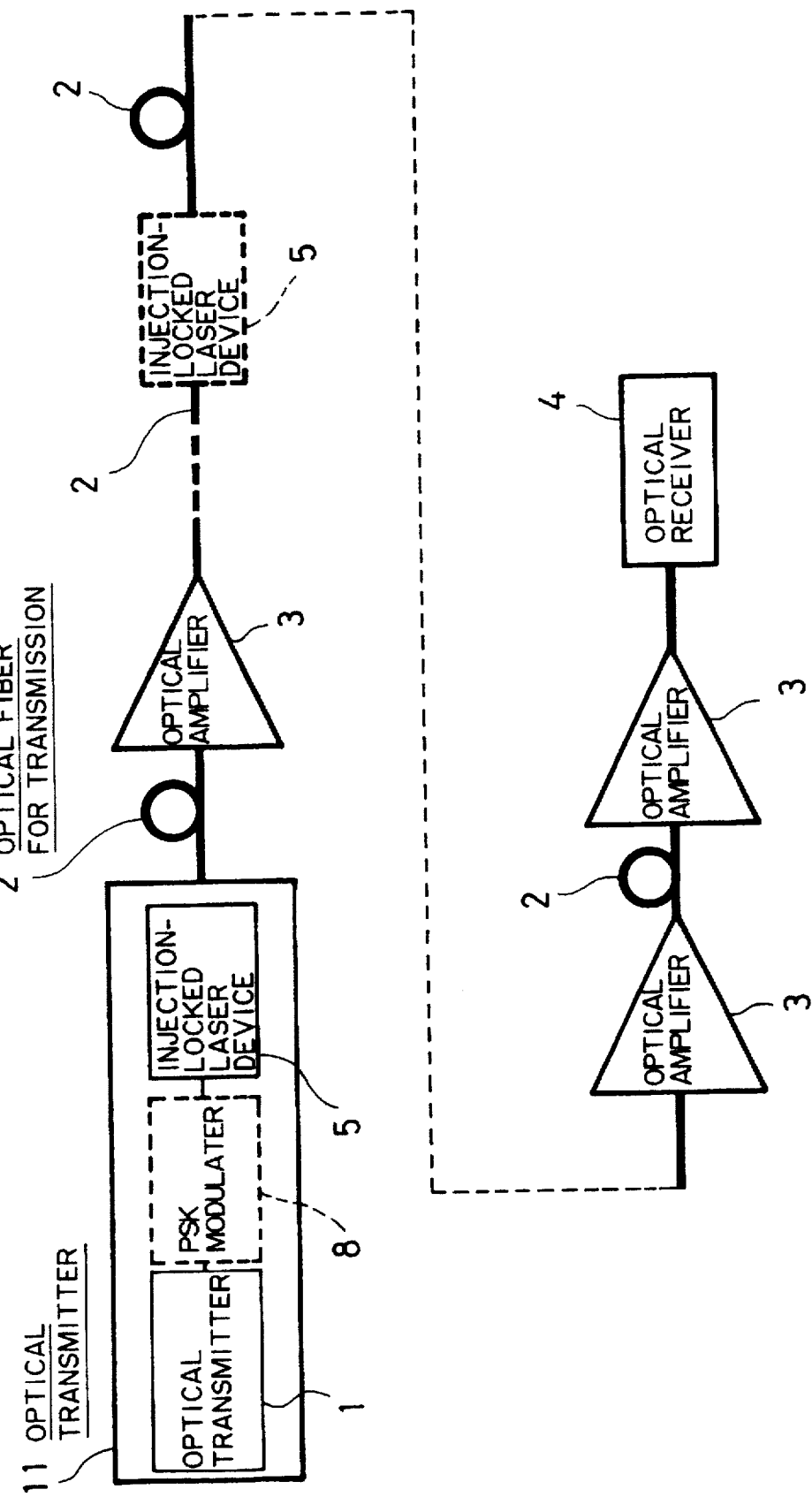
FIG. 5 is a block diagram illustrating a fifth embodiment of the optical communication system of the present invention.

The arrangement of the fifth embodiment of the optical communication system of the present invention is shown in FIG. 5. In FIG. 5, the same reference numerals are assigned to the same components as in FIG. 1, omitting their description; however, reference numeral 8 indicates a PSK modulator equipped within an optical transmitter block 11.

In this fifth embodiment, the optical transmitter block 11 comprises the optical transmitter 1 and the injection-locked laser device 5. The residual intensity modulation component generated by the optical transmitter 1 can be suppressed by connection of the injection-locked laser device 5 to the output of the optical transmitter 1, improving the transmission characteristics.

As indicated in a dashed line, by inserting the injection-locked laser device 5 at a specified point on the optical transmission fiber 2, the intensity noise component generated during transmission is suppressed, allowing excellent transmission characteristics. When equipping the system with PSK modulator 8, it should be located between the optical transmitter 1 and the injection-locked laser device 5.

In the first through fifth embodiments described above, an erbium-doped optical fiber amplifier, a semiconductor laser optical amplifier, and a fiber Raman optical amplifier can be employed as the optical amplifier 3.

Figure 6:
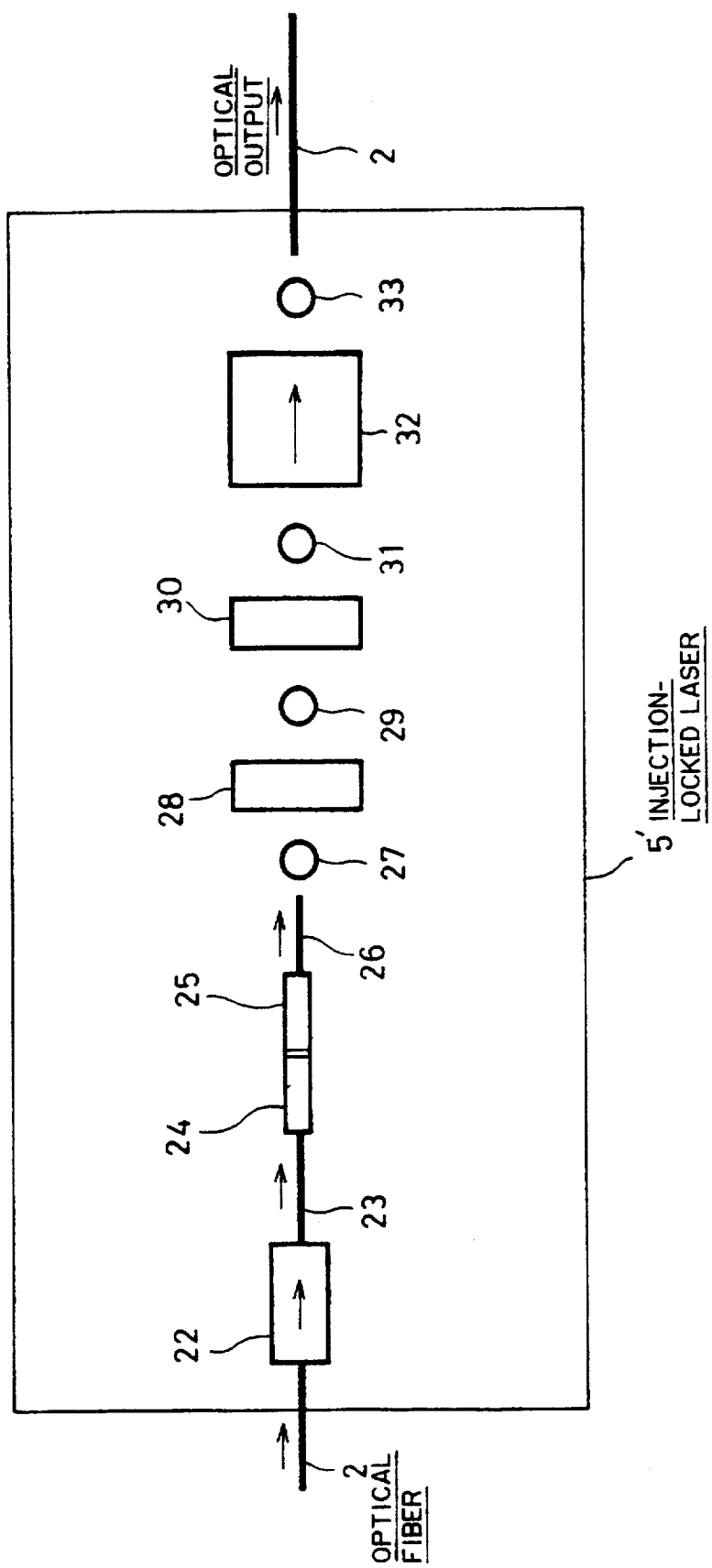
FIG. 6 is a block diagram showing an example of the structure of an injection-locked laser device.

FIG. 6 illustrates an example of detailed structure of the injection-locked laser device 5', and its operation will be described.

The optical signal from the optical amplifier 3 in a previous stage, for example, is propagated through the optical fiber 2 and applied to a polarization independent optical fiber isolator 22. The optical signal passed through the polarization independent optical fiber isolator 22 becomes parallel light by the lens 27, and is fed to the lens via optical connectors 24 and 25 with low reflection and an optical fiber 26. The parallel space propagation light is passed through a polarizer 28 located so that the polarized direction of the input light to a semiconductor laser 30 becomes the horizontal polarization and then focused to the semiconductor laser 30 by the lens 29.

Since the wavelength of the free-running frequency of the semiconductor laser 30 is set to be adjacent to the wavelength of the injected optical input, the optical input leads the semiconductor laser 30 to output a synchronously oscillated laser light. Consequently, the amplified light with the same wavelength in phase with the optical input is output from the semiconductor laser 30. The amplified lights are output from both sides of the semiconductor laser 30; one output is applied to the isolator 32 for the space propagation light via the lens 31, then focused by the lens 33, fed into the optical fiber 2, and propagated to the optical amplifiers in the next stage, for example.

Further, the laser light emitted to the input port from the semiconductor laser 30 is applied to the polarization independent optical fiber isolator 22 via the lens 29, the polarizer 28, the lens 27, the optical fiber 26, the optical connectors 25 and 24 with low reflection, and the optical fiber 23. Since this isolator 22 propagates no light to the direction of the optical fiber 2, the amplified light is not output to the optical fiber 2.

According to the injection-locked laser 5', the light can be effectively injected by the following procedures: when the lens 27, the polarizer 28 and the lens 29 are to be aligned and incorporated, remove the optical connector 25 with low reflection from the optical connector 24 with low reflection, and set the semiconductor laser 30 to the active operation, while observing the output light from the semiconductor laser 30 to the input via the optical connector 25 with low reflection, adjust the above-mentioned optical parts to the maximum optical power.

The polarizer 28 allows to set the state of the polarization of the light to be applied to the semiconductor laser 30 to the horizontal polarization (TE wave). It provides the semiconductor laser 30 to operate stably, preventing the light from vertical polarization.

Figure 7:
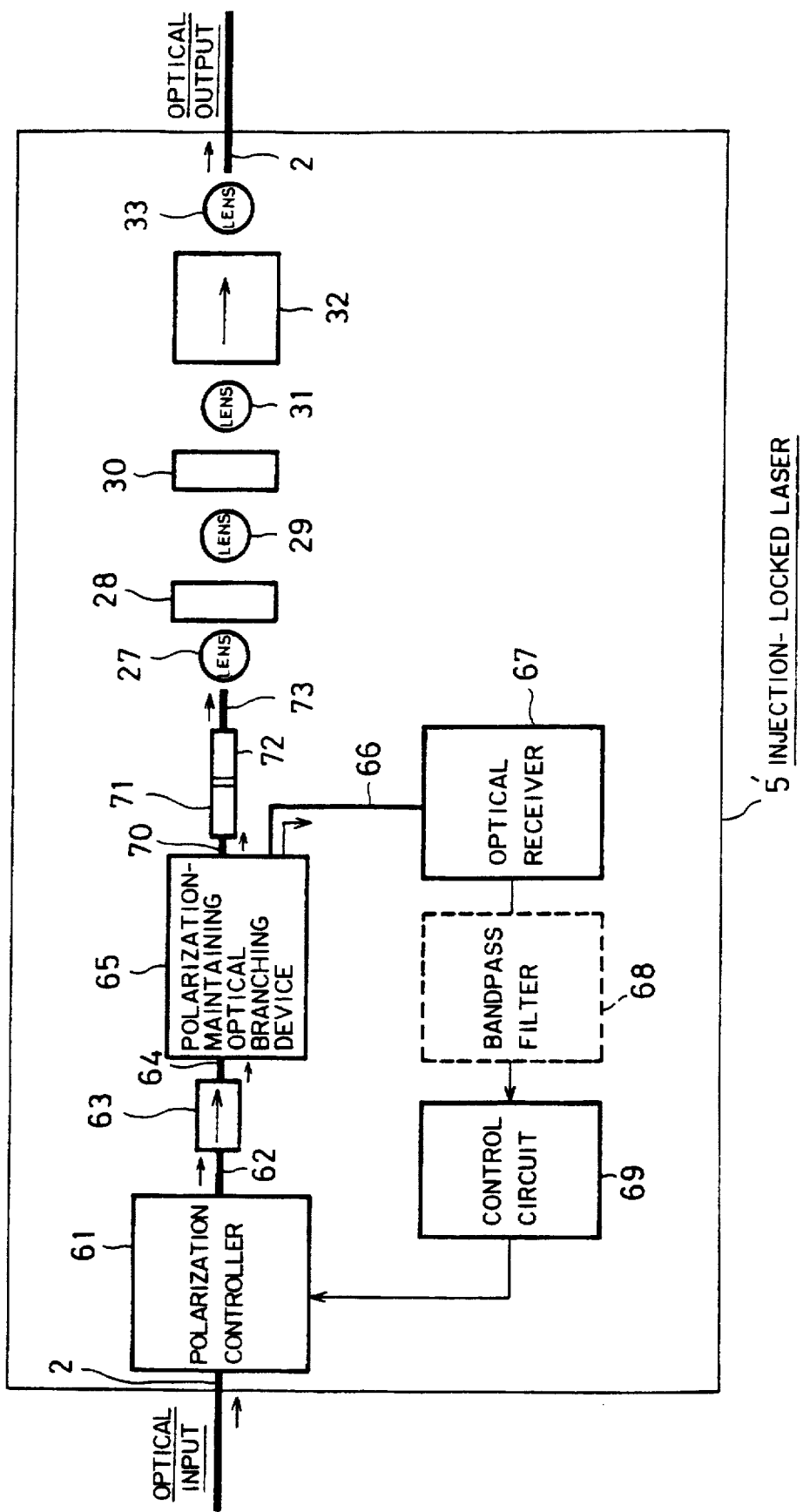
FIG. 7 is a block diagram showing another example of the structure of an injection-locked laser device.

FIG. 7 shows another example of the structure of the injection-locked laser 5'; the same parts as in FIG. 6 are also indicated by the same numerals, omitting their description.

The injection-locked laser 5' structured as shown in FIG. 7 operates in the following manner: The optical signal from the optical amplifier 3 in the previous stage is propagated through the optical fiber 2 and applied to a polarization controller 61 to set it to be the horizontal polarization. Then it is applied to a polarization independent optical fiber isolator 63 via the polarization-maintaining fiber 62. The output from the polarization independent optical fiber isolator 63 is passed through a polarization-maintaining fiber 64. Then, a part of the light preserving its polarization state to be horizontal is divided by a polarization-maintaining optical branching device 65 which preserves the state of polarization. The divided light is passed through a polarization-maintaining fiber 66 and is received by an optical receiver 67 where the intensity of the light is observed. A control circuit 69 connected so that the intensity of the light becomes the maximum controls the polarization controller.

Additionally, the other part of the light which is not divided by the optical branching device 65 which preserves the state of polarization is passed through a polarization-maintaining fiber 70 and optical connectors 71 and 72 with low reflection which preserves the state of polarization. It is then applied to the lens 27 via a polarization-maintaining fiber 73 to be a parallel light. The space propagation light preserving the horizontal polarization which became the parallel light is passed through the polarizer 28 located to be horizontal polarization. It is focused to the semiconductor laser 30 by the lens 29. This activates synchronous oscillation of the semiconductor laser 30.

In this example, as described above, the optical components and fibers to be connected to the input of the semiconductor laser 30 are those which preserve the state of polarization. This allows the state of polarization of the input light to be injected to the semiconductor laser 30 stable. Therefore, in addition to the effect described with reference to the example in FIG. 6 mentioned above, the light with the horizontal polarization having sufficient intensity can be applied to the semiconductor laser 30, ensuring the stable operation of the injection-locked laser device 5'.

In the example described in this embodiment, the optical fiber isolator 63 with a polarization maintaining fiber is located in front of the optical branching device 65 which preserves the state of polarization, however, the order of these devices can be changed. A similar effect is provided in the configuration where the optical fiber isolator 63 with a polarization-maintaining fiber is located after the polarization-maintaining optical branching device 65 which preserves the state of polarization.

When the wavelength-division multiplexed lights are introduced from the optical fiber 2, if there is slight amplitude modulation with a single frequency peculiar to the wavelength of the individual optical signal of the wavelength-division multiplexed lights, insert a bandpass filter 68 which has the same center frequency as the modulation frequency of the desired optical signal in the wavelength-division multiplexed lights, as indicated in dashed lines, after the optical receiver 67. This allows the polarization controller 61 to effect stable control of the polarization of only the desired optical signal, when the wavelength-division multiplexed lights are introduced into the injection-locked laser device.

Moreover, the polarization controller 61 may be located after the optical bandpass filter. In this case, only the desired light may be introduced, separated from the wavelength-division multiplexed lights, ensuring a stable operation.

As described above, since the injection-locked laser device has the reshaping and regenerating functions, the intensity modulation component is suppressed at the output of the injection-locked laser, even if the input light contains the intensity modulation component due to the noise component generated during transmission, providing the output light in which the intensity noise is sufficiently suppressed.

The present invention consequently resolves the problem wherein the characteristics of the optical communication system are degraded by the conversion of the intensity noise into the phase noise. This permits long-haul transmission exceeding 4,000 km by far which is the approximate limit of the transmission distance in a conventional coherent optical communication system.

We claim:

1. An optical communication system for coherent optical transmission comprising:

an optical transmitter for transmitting a coherent optical signal connected to one end of an optical transmission fiber;

an optical receiver for receiving the coherent optical signal connected to the other end of the optical transmission fiber;

an optical amplifier for amplifying the coherent optical signal inserted in the optical transmission fiber;

an injection-locked laser device for alleviating the intensity noise of the coherent optical signal inserted in the optical transmission fiber;

said injection-locked laser device comprising;

a polarization independent optical fiber isolator for leading the coherent optical signal;

a first optical connector for leading the coherent optical signal from the polarization independent optical fiber isolator;

a second optical connector which can fit in or pull out the first optical connector freely; and a semiconductor laser for alleviating the intensity noise of the coherent optical signal by regenerating according to the coherent optical signal sent from the second optical connector.

2. An optical communication system for coherent optical transmission comprising:

an optical transmitter for transmitting a coherent optical signal connected to one end of an optical transmission fiber;

an optical receiver for receiving the coherent optical signal connected to the other end of the optical transmission fiber;

an optical amplifier for amplifying the coherent optical signal inserted in the optical transmission fiber;

an injection-locked laser device for alleviating the intensity noise of the coherent optical signal inserted in the optical transmission fiber;

said injection-locked laser device comprising:

an optical fiber isolator with a polarization-maintaining fiber for leading the coherent optical signal;

a first optical connector with a polarization-maintaining fiber for leading the coherent optical signal from the optical fiber isolator with a polarization-maintaining fiber;

a second optical connector with a polarization-maintaining fiber which can fit in or pull out the first optical connector freely with a polarization-maintaining fiber;

a semiconductor laser for alleviating the intensity noise of the coherent optical signal by regenerating according to the coherent optical signal sent from the second optical connector;

a first optical polarization-maintaining divider which can divide a part of the coherent optical signal;

an optical receiver for receiving the divided coherent optical signal by the first optical divider; and a polarization controller installed at an input side of the optical fiber isolator with a polarization-maintaining fiber wherein the polarization state is controlled by the output from the optical receiver.

3. The optical communication system in accordance with claim 2 wherein the optical transmitter includes an injection-locked laser for alleviating the intensity noise of the coherent optical signal.

4. The optical communication system in accordance with claim 2 wherein the optical transmitter transmits a wavelength-division multiplexed coherent optical signal.

5. The optical communication system in accordance with claim 4 wherein the injection-locked laser device comprising the same number of injection-locked lasers as the multiplexing number of the wavelength-division multiplexed coherent optical signal, and wherein the optical communication system includes:

an optical divider for dividing the wavelength-division multiplexed coherent optical signal to the injection-locked laser device, and an optical combiner for combining several optical signals output from the injection-locked laser device.

6. An optical communication system for coherent optical transmission comprising:

an optical transmitter for transmitting a wavelength-division multiplexed coherent optical signal connected to one end of an optical transmission fiber;

at least one branch optical transmission fiber branched at a branching point of the optical transmission fiber, an optical divider for dividing the wavelength-division multiplexed coherent optical signal to the optical transmission fiber and to the branch optical transmission fiber(s) at the branching point, optical receivers for receiving the wavelength-division multiplexed coherent optical signal connected to the other ends of the optical transmission fiber and the branch optical transmission fiber(s);

an optical amplifier for amplifying the wavelength-division multiplexed coherent optical signal inserted in the optical transmission fiber or the branch optical transmission fiber(s); and injection-locked laser devices for selecting respective wavelengths and alleviating the intensity noise of the coherent optical signal output from the optical divider inserted in the optical transmission fiber and the branch optical transmission fiber(s).

7. The optical communication system in accordance with claim 6 wherein the optical transmitter includes an injection-locked laser for alleviating the intensity noise of the wavelength-division multiplexed coherent optical signal.

8. An optical communication system for coherent optical transmission comprising:

a first optical transmitter for transmitting a first wavelength-division multiplexed coherent optical signal connected to one end of a first branch optical transmission fiber;

a first optical amplifier for amplifying the first wavelength-division multiplexed coherent optical signal inserted in the first branch optical transmission fiber;

a first optical divider for dividing the wavelength-division multiplexed coherent optical signal output from the first optical amplifier;

a first injection-locked laser device for selecting respective wavelengths and alleviating the intensity noise of the first wavelength-division multiplexed coherent optical signal output from the first optical divider inserted in the first branch optical transmission fiber;

a second optical transmitter for transmitting a second wavelength-division multiplexed coherent optical signal connected to one end of a second branch optical transmission fiber;

a second optical amplifier for amplifying the second wavelength-division multiplexed coherent optical signal inserted in the second branch optical transmission a second optical divider for dividing the second wavelength-division multiplexed coherent optical signal output from the second optical amplifier;

a second injection-locked laser device for selecting respective wavelengths and alleviating the intensity noise of the first wavelength-division multiplexed coherent optical signal output from the second optical divider inserted in the second branch optical transmission fiber;

an optical combiner for combining the first wavelength-division multiplexed coherent optical signal and the second wavelength-division multiplexed coherent optical signal to a third branch optical transmission fiber; and an optical receiver for receiving the wavelength-division multiplexed coherent optical signal output from the optical combiner connected to the other end of the third branch optical transmission fiber.

9. The optical communication system in accordance with claim 8 wherein the first optical transmitter includes a first injection-locked laser for alleviating the intensity noise of the first wavelength-division multiplexed coherent optical signal, and the second optical transmitter includes a second injection-locked laser for alleviating the intensity noise of the second wavelength-division multiplexed coherent optical signal.

10. An injection-locked laser device used in an optical communication system for coherent optical transmission, said device comprising:

a polarization independent optical fiber isolator for leading the coherent optical signal;

a first optical connector for leading the coherent optical signal from the polarization independent optical fiber isolator;

a second optical connector which can fit in or pull out the first optical connector freely; and a semiconductor laser for alleviating the intensity noise of the coherent optical signal by regenerating according to the coherent optical signal sent from the second optical connector.

11. An injection-locked laser device used in an optical communication system for coherent optical transmission, said device comprising:

an optical fiber isolator with a polarization-maintaining fiber for leading the coherent optical signal;

a first optical connector with a polarization-maintaining fiber for leading the coherent optical signal from the optical fiber isolator with a polarization-maintaining fiber;

a second optical connector with a polarization-maintaining fiber which can fit in or pull out the first optical connector freely with a polarization-maintaining fiber;

a semiconductor laser for alleviating the intensity noise of the coherent optical signal by regenerating according to the coherent optical signal sent from the second optical connector;

a first optical polarization-maintaining divider which can divide a part of the coherent optical signal;

an optical receiver for receiving the divided coherent optical signal by the first optical divider; and a polarization controller installed at an input side of the optical fiber isolator with a polarization-maintaining fiber wherein the polarization state is controlled by the output from the optical receiver.

12. The optical communication system in accordance with claim 2 wherein the optical transmitter includes an injection-locked laser for alleviating the intensity noise of the coherent optical signal.

13. The optical communication system in accordance with claim 2 wherein the optical transmitter transmits a wavelength-division multiplexed coherent optical signal.

14. The optical communication system in accordance with claim 13 wherein the injection-locked laser device comprises the same number of injection-locked lasers as the multiplexing number of the wavelength-division multiplexed coherent optical signal, and wherein the optical communication system includes:

an optical divider for dividing the wavelength-division multiplexed coherent optical signal to the injection-locked laser device, and an optical combiner for combining several optical signals output from the injection-locked laser device.

* * * * *